Feb. 2, 1971 — W. T. ANDERSON — 3,560,831
BATTERY LOAD BANK
Filed Oct. 24, 1967
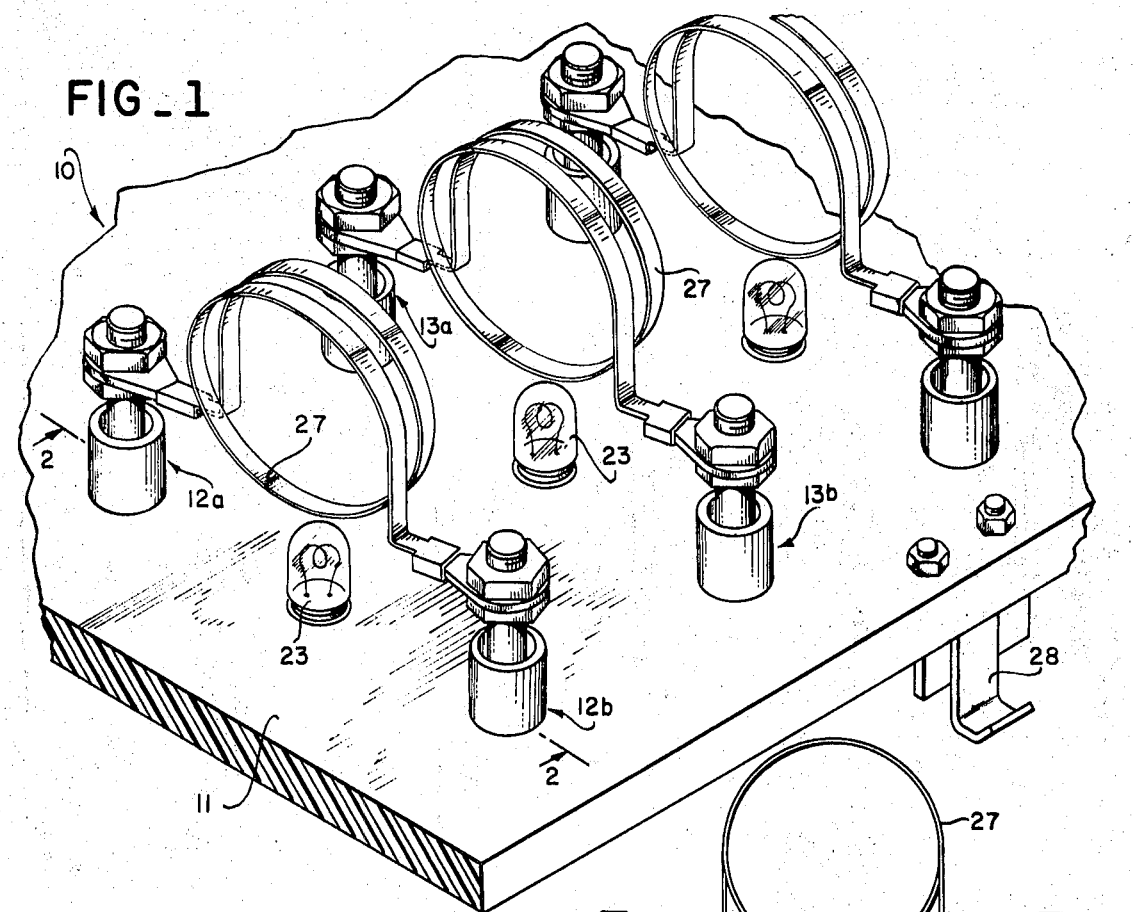
FIG_1
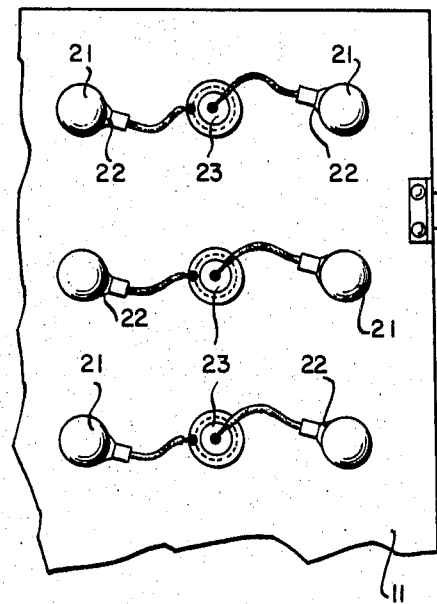
FIG_3
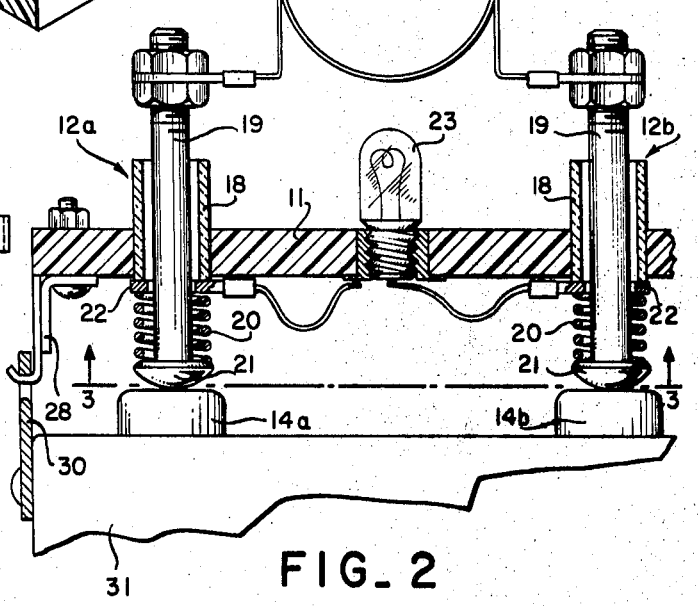
FIG_2
INVENTOR.
WENDELL T. ANDERSON
BY George C. Sullivan
Agent

United States Patent Office 3,560,831
Patented Feb. 2, 1971

3,560,831
BATTERY LOAD BANK
Wendell T. Anderson, Canton, Ga., assignor to Lockheed Aircraft Corporation, Burbank, Calif.
Filed Oct. 24, 1967, Ser. No. 677,689
Int. Cl. H02j 7/00
U.S. Cl. 320—48
10 Claims

ABSTRACT OF THE DISCLOSURE

A load bank for independently discharging each cell of a multiple cell battery. A separate resistive load is provided for each cell, and a lamp corresponding to each cell indicates the completion of the discharge of a particular cell. The apparatus can be readily attached to or removed from a battery to be discharged.

---

This invention relates in general to a load bank and in particular to a load bank for independently discharging the cells of a multiple cell battery.

The proper care and maintenance of certain kinds of multiple cell storage batteries require the battery to be completely discharged periodically. In the use of a nickel-cadmium multiple cell battery, for example, the individual cells comprising the battery seldom, if ever, are electrically identical because of differences in aging of the cells and for other reasons which cannot be practicably controlled. When a battery having at least one relatively weak cell is being discharged into a load, the weak cell can reach a state of complete discharge and then, under the influence of the battery current being forced through this cell, will undergo polarity reversal and commence being reverse charged. This condition, known as cell reversal, is particularly undesirable with nickel-cadmium batteries since such cell reversal produces gassing of the cell, which can lead to catastrophic explosion of the battery.

The problem of battery cell reversal is alleviated by deliberately causing each cell of the battery to become completely discharged so that the condition of all of the cells in the battery is known. The battery then is recharged to the desired level and placed in service. This has proved time-consuming and risky, however, since complete discharge of the battery has been accomplished heretofore by placing a load such as a resistance bank across the terminals of the battery. It will be apparent, however, that discharging the battery in this way may cause reversal of one or more of the battery cells as described above. Even if care is taken to prevent excessive gassing of any reversed cells following apparent complete discharge of the battery, as indicated by zero voltage at the battery terminals, each individual cell of the battery must be checked to determine whether reversal of that cell has occurred. Any such reversed cells must then be individually jumpered with an individual temporary connection including a suitable resistance. Also, all battery cells that have not undergone reversal must be individually shorted by temporary jumper connections for a period of several hours to insure that each and every cell of the battery is completely electrically discharged. Obviously the several steps heretofore employed to discharge completely multiple cell batteries are time-consuming and, in view of the risk of cell explosion, hazardous to the person performing these steps.

Accordingly, it is an object of this invention to provide an improved apparatus for discharging a multiple cell battery.

It is an additional object of this invention to provide apparatus for quickly and safely discharging a multiple cell battery without causing cell reversal.

It is another object of this invention to provide apparatus for enabling all cells of a battery to be completely discharged with no risk of reversal of individual cells.

It is a further object of this invention to provide a battery discharging load bank which is quickly and readily attachable to or detachable from a battery to be discharged.

It is still another object of this invention to provide a battery discharging load bank in which individual battery cells need not be inspected to ascertain whether cell reversal has occurred.

The foregoing objects of this invention as well as other objects and advantages thereof are accomplished with the present invention, an embodiment of which is described below.

Stated generally, the embodiment of the invention described herein includes a base which can be removably secured to that portion of the battery whereat the individual cell terminals are exposed. On the base are mounted a number of contacting members aligned to correspond to each of the individual cell terminals. An individual load resistance is connected across each contact member pair corresponding to an individual cell, and an individual indicator device such as a light bulb also may be connected across the contact member pairs to indicate the state of cell discharge.

The exact nature of this invention is determined with reference to the embodiment thereof as depicted in the following figures, wherein:

FIG. 1 shows an isomeric view of a broken-away portion of an embodiment of the invention;

FIG. 2 shows a section view taken along line 2—2 of FIG. 1 and showing a portion of the depicted embodiment as applied to a battery; and FIG. 3 shows a view of the underside of the depicted embodiment taken along line 3—3 of FIG. 2.

Turning now to FIG. 1, there is shown generally at 10 a load bank having a base 11 which preferably, although not necessarily, is of an electrically insulative material. The base 11 is preferably dimensioned or configured to fit in close proximity to the battery surface whereat the individual cell terminals are located. A number of pairs of feedthrough terminals 12a, 12b; 13a, 13b; and so on are provided on the base 11, with the spacing between each of the terminals, for example terminals 12a and 12b, comprising a terminal pair corresponding to the spacing between the two cell terminals 14a and 14b of a particular cell in a battery to be discharged, as seen in FIG. 2. The following description refers only to feedthrough terminals 12a and 12b; it will be understood, however, that all such terminals, corresponding to all cells of the battery to be discharged, are identical.

Each of the feedthrough terminals 12a and 12b includes a collar 18 through which a bolt or other rod-like conductor 19 is mounted for limited reciprocal movement. A compression spring 20 extends between the enlarged head portion 21 of conductor 19 and the lower end of collar 18 to urge the conductor downwardly with respect to the base 11. An electrical terminal 22 is disposed between each spring 20 and collar 18, and conductors extend from each of these terminals to an electrical indicating device provided for each terminal pair and which simply may be a conventional flashlight bulb 23 received in a suitable socket.

A discharge resistance 27 is connected across the upwardly extending ends of the rod-like conductors 19 of each feedthrough terminal pair. The resistance value of each discharge resistance 27 is selected to provide the desired discharge rate of the cells to be discharged.

If the base 11 is made of a non-conductive material, then no other particular precautions need be taken to insulate the feedthrough terminals from each other. However, suitable insulation must, of course, be provided for the feedthrough terminals if the base is made of metal. One or more brackets 28, 29 are attached to the base 11 for retaining engagement with corresponding brackets 30 on a battery 31 to be discharged.

In the use of the present invention, the base 11 is positioned adjacent the terminal portion of a battery 31 to be discharged such that each of the head portions 21 of the conductors 19 engages a corresponding one of the cell terminals. The arrangement of the feedthrough terminal pairs on the base 11 is selected to cause the terminals 14a, 14b of each battery cell to register with a corresponding pair 12a, 12b of feedthrough terminals so that each battery cell is placed in circuit with a corresponding discharge resistance 27 and light bulb 23. If necessary or desired, the brackets 28 on the base 11 are engaged with the corresponding brackets 30 on the battery to ensure the proper alignment between the load bank and the battery, and to cause each of the rod-like conductors 19 to be yieldingly urged against the force of springs 20 and toward the respective battery terminal 14a to ensure a positive connection between the battery terminal and the head portion 21.

Each of the battery cells is discharged through the corresponding resistance 27 until each cell is completely discharged. The terminal voltage of the individual cells is indicated by the relative brilliance of the bulbs 23 and it can be seen that none of the cells can undergo polarity reversal since each cell has its own discharge path isolated from the remaining cells. After the cells have reached a state of complete discharge, the apparatus of this invention is retained in place on the battery so that the continued presence of the resistances 27 across the cells, these resistances being of a relatively low value, effectively performs the function of individual cell short circuiting, which was accomplished manually in the prior art as described above. After the desired number of hours of cell shorting has occurred, the apparatus of this invention is easily removed from the battery to permit the battery to be recharged and again placed in service. Since there can be no possibility of cell reversal through the use of the present apparatus, there is no need to remove the battery from the aircraft or other environment of use as a safety precaution prior to discharge of the battery.

It should be understood of course that the foregoing relates only to a preferred embodiment of the invention and that numerous modifications or alterations may be made therein without departing from the spirit and scope of the invention as set forth in the appended claims.

What is claimed is:

1. A load bank for discharging the individual cells of a multiple cell battery, comprising:
   a supporting member dimensioned to be received adjacent a cell terminal portion of the battery;
   a plurality of pairs of electrical conductive members mounted on said supporting member;
   each of said conductive members having a terminal portion on a first side of said supporting member, the terminal portions of said conductive members of said pairs being spaced apart one from the other to enable engagement of the terminals of the battery cells with a corresponding pair of said conductive members when said supporting member is received adjacent the battery cell terminal portion; and
   an individual electrical load connected between each of said conductive members of each said pair,
   each of said individual electrical loads being disposed on said supporting member.

2. Apparatus as in claim 1, wherein:
   said electrical conductive members extend through said supporting member to a second side thereof; and
   said electrical load is connected between said conductive members on said second side of said supporting member.

3. Apparatus as in claim 2, further comprising:
   an electrical indicator corresponding to each pair of said electrical conductive members and disposed on said supporting member to be capable of providing a visible indication when said supporting member is received against a battery for discharge,
   said indicator being electrically connected to the conductive members of the corresponding said pair to indicate the presence of a potential difference across the corresponding cell during the use of the load bank.

4. Apparatus as in claim 3, wherein each of said electrical indicators comprises a source of illumination.

5. Load bank apparatus for individually discharging the cells of a multiple cell battery, comprising:
   a supporting member having an area generally coextensive with the cell terminal portion of a battery to be discharged;
   a plurality of pairs of electrodes mounted on said supporting member, said electrode pairs and electrodes of each pair being spaced one from the other for contacting engagement of each electrode pair with the terminals of a corresponding cell of a battery to be discharged;
   alignment means associated with said supporting member to effect cooperative registration of said supporting member and a battery to be dsicharged so that each one of said electrodes is properly aligned with the corresponding cell terminal; and
   an individual electrical load corresponding to each of said pairs of electrodes and connected between the electrodes of each electrode pair,
   each of said individual electrical loads being disposed on said supporting member.

6. Apparatus as in claim 5, wherein:
   each of said electrodes has a cell terminal engaging portion disposed on one side of said supporting member and a load connective portion disposed on another side of said supporting member,
   said electrical loads being disposed on said other side of said supporting member and being connected to said load connective portion of the corresponding electrode pairs.

7. Apparatus as in claim 5, further comprising:
   an electrical indicator corresponding to each of said pairs of electrodes and disposed on said supporting member to be visible when said supporting member is positioned in cell discharging relationship with a battery.

8. Apparatus as in claim 5, wherein each of said electrodes has a cell terminal engaging portion disposed on one side of said supporting member, said electrodes being yieldingly biased to displace said cell terminal engaging portions outwardly from said one side of said supporting member.

9. Apparatus as in claim 8, wherein:
   each of said electrodes includes a generally elongate conductive member received in a corresponding opening formed in said supporting member for limited reciprocal movement therein;
   each of said cell terminal engaging portions being disposed at an end of said elongated member; and further comprising
   a spring member yieldingly disposed between said elongate member and said supporting member to urge said elongate member in a direction to displace said cell terminal engaging member outwardly from said one side of said supporting member.

10. Apparatus as in claim 9, wherein:
    each of said electrodes includes a load connective portion disposed on another side of said supporting member;
    said electrical loads being connected to said load connective portions of the corresponding electrode parts; and further comprising
    an indicator lamp corresponding to each of said electrode pairs and positioned to be visible on said other side of said supporting member adjacent said load connective portion of the respective pair of electrodes to provide a separate indication of the potential differences across each of the respective cells being discharged.

References Cited

UNITED STATES PATENTS

| | | | |
|---|---|---|---|
| 953,640 | 3/1910 | Patterson | 320—3X |
| 2,904,739 | 9/1959 | Reed, Jr. | 320—48X |
| 3,118,137 | 1/1964 | Vincent | 340—249 |
| 3,343,058 | 9/1967 | Deschamps et al. | 320—17 |
| 3,454,859 | 7/1969 | Ford et al. | 320—6 |
| 3,463,996 | 8/1969 | Frezzolini | 320—17 |

J D MILLER, Primary Examiner

J. M. GUNTHER, Assistant Examiner

U.S. Cl. X.R.

307—51, 157; 320—17, 51; 340—249